United States Patent [19]

Carini

[11] 4,221,388
[45] Sep. 9, 1980

[54] COLOR MATCHING GAME

[75] Inventor: Edward Carini, Mount Kisco, N.Y.

[73] Assignee: Hasbro Industries, Inc., Pawtucket, R.I.

[21] Appl. No.: 17,698

[22] Filed: Mar. 5, 1979

[51] Int. Cl.³ .............................................. A63F 3/00
[52] U.S. Cl. ..................................... 273/248; 273/288
[58] Field of Search ............... 273/243, 236, 289, 288, 273/290, 291, 248, 249; 35/28.3

[56] References Cited

U.S. PATENT DOCUMENTS

| | | | |
|---|---|---|---|
| 2,722,424 | 11/1955 | Hum | 273/261 |
| 3,454,279 | 7/1969 | Foley et al. | 273/1 R |
| 3,861,684 | 1/1975 | Gastin et al. | 273/243 X |

Primary Examiner—Richard C. Pinkham
Assistant Examiner—Scott L. Brown
Attorney, Agent, or Firm—Salter & Michaelson

[57] ABSTRACT

A game in which a pair of game pieces are progressively moved back and forth along a game board. Each of the pieces includes a plurality of longitudinally oriented segments delineated by different colors arranged in the same sequence on each piece. The play is effected by progressive moves determined by a color selection device such that each moving piece is shifted longitudinally with respect to the game board and the non-moving piece such that the same colored segments thereof are laterally aligned. Dependent on the colors selected on progressive moves, one or both of the game pieces will move toward or away from its goal at an opposite end of the game board.

9 Claims, 4 Drawing Figures

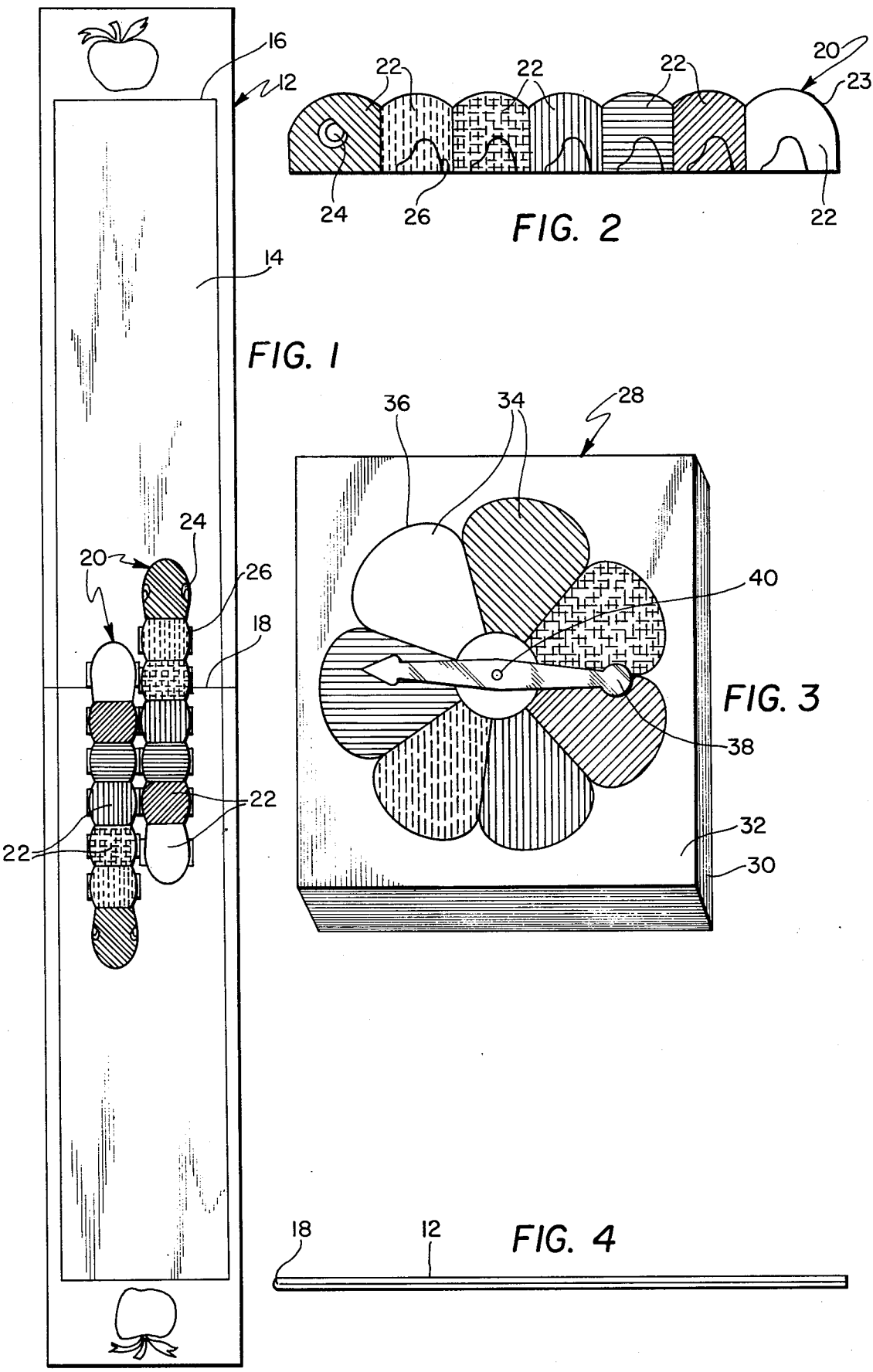

COLOR MATCHING GAME

BACKGROUND OF THE INVENTION

This invention deals with a game for teaching children colors and other delineated media in a pleasantly competitive and enjoyable game environment. Recognizing and matching colors is an important preschool activity. It would be accordingly desirable to combine such activity in a game environment such that the learning of such colors is more enjoyable and so as to provide an activity game which includes a teaching function. While the general concept of utilizing color to control movement of game pieces such as shown in U.S. Pat. No. 3,414,264 is known, there remains a need for a simple and yet instructive game which includes such concept in a new and interestingly different manner.

It is accordingly an object of the present invention to provide a game in which color or other delineated media is utilized as the mechanism for controlling the movement of game pieces.

A further object of the present invention is the provision of a game of the aforementioned type which is simple to learn and fun to play and which teaches recognition and matching of various delineated media such as color to preschool children.

These and other objects of the present invention are accomplished by a game including a pair of similar game pieces wherein each piece includes a plurality of differently colored lengthwise extending segments and selection means for selecting a particular color such that the moves of the game pieces with respect to each other and a playing surface may be carried out by positioning the same colored segments of opposed game pieces laterally adjacent each other. In this regard the game pieces are positioned side by side while facing in opposite directions upon a board or similar playing surface having a goal for each of the game pieces at respective ends thereof. The first piece to reach its goal after a series of moves controlled in the above explained manner wins the game.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a plan view of the game board of the present invention with the pair of game pieces thereof disposed thereon in playing position;

FIG. 2 is a side elevational view of one of the game pieces;

FIG. 3 is a perspective view of the color selection means of the present invention; and FIG. 4 is a side view of the game board shown in FIG. 1 in a closed folded position.

DESCRIPTION OF THE INVENTION

Referring to the drawing, the game 10 of the present invention includes a generally planar longitudinally orientated game board 12 having suitable graphics displayed on the upper surface thereof so as to define a playing surface 14, and having goal lines 16 on opposite ends thereof. A symbol, such as the apple shown, may also serve as the goal in a manner that will hereinafter be more fully brought out. The board 12 is transversely hinged about a centrally disposed line 18 such that the board may be folded for easy storage as particularly shown in FIG. 4.

The game further includes a pair of game pieces 20, each of essentially similar construction and each provided with a plurality of segments 22 extending along the length thereof and forming a body 23 which may take the shape of a caterpillar or other creature having appeal to children, particularly those of preschool age. Each of the segments 22 is delineated from the others in a predetermined linear arrangement which is similar for each of the game pieces 20. The media of such delineation is preferably different colors, i.e., the body of the game piece is arranged so as to present a series of differently colored linearly adjacent segments. Additionally, one end of the game is designated as the head, i.e., that segment including an eye 24 on opposite sides thereof and the opposite end as the tail. The pieces may also be provided with additional decoration such as the provision of simulated leg portions 26 extending outwardly from opposite sides thereof.

As shown in the drawing, each of the pieces 20 includes linearly adjacent segments in the following colored progression when viewed from head to foot, that is, left to right as shown in FIG. 2: green, purple yellow, red, blue, brown, and white. Although other color combinations may be utilized, it is preferable that the same progression is used for each of the similar game pieces 20. It should also be brought out that although the preferred form of delineation media is color, other forms of delineation may be utilized. For instance, the segments could be provided with similar number progressions wherein the different numbers delineate the various segments rather than color. Also other delineation media such as those perceivable by a child's other perceptory senses such as touch, may be utilized.

In addition to the playing surface provided by the game board 12 and the game pieces 20, the game 10 of the present invention includes a selection device 28 which in the preferred color basis of the game comprises a support 30 having an upper surface 32 which is provided with a radiating array of various colors used to delineate the different segments of the game pieces 20. In that regard, each of the different colors occupies a pie shaped sector 34 of a circle 36. The center of the circle 36 is provided with a spinner 38 appropriately mounted for pivotal movement with respect to the upper surface 32 of the support 30. Accordingly, various colors may be selected for progressive turns in the game by rotating the spinner 38.

Play of the game progresses in the following manner: The pair of game pieces 20 are longitudinally aligned on the playing surface 14 facing in opposite directions and disposed generally centrally thereof in side by side relationship, that is, with the red segments laterally adjacent each other, (note that the blue segments are aligned in FIG. 1). After determining which player is to go first, the spinner 38 is operated to designate a color and then that player moves his game piece until the selected color segment on his piece is laterally adjacent the same color segment on the other piece. Play progressively continues with each player alternately operating the spinner 38, i.e., each subsequent move is carried out by another rotation of the spinner 38 to select a different color which again is matched by adjacent placement of that particularly colored segment with its counterpart in the other game piece, this being continued until one player wins by having his game piece reach his respective goal line 16.

A specific example of how game play might proceed with the right-hand piece 20 (as shown in FIG. 1) initially moving, is as follows: The first spin designates white as color. Accordingly the right-hand piece 20 is moved upwardly along the playing surface 14 until the white segments 22 are aligned laterally adjacent each other. During such move the left-hand piece 20 remains stationary. The second spin designates the color purple. This time the left-hand piece moves upwardly until the purple segments are positioned adjacent each other. The next spin designates red whereupon the right-hand piece moves upwardly until the red segments are adjacent each other. The next spin designates the color green, and when the left-hand piece 20 is upwardly moved such that the green segments of the game pieces are adjacent each other, the left-hand game piece backs over the goal line 10 and accordingly wins the game. Obviously other rules can be designed including the requirement that a particular goal line be crossed or that it be crossed in a particular manner, i.e., head first. Also in this manner, the apple or other graphic indicia provided at opposite ends of the playing surface 14 may serve as an alternate goal, that is, the playing piece must touch the apple in order for a win to be registered, e.g., the playing piece could take the form of a worm and the first "worm" to "bite" the apple would win. Other modifications and variations of game play may also be effected as desired. Accordingly, it is believed that a unique and interesting educational game which is fun to play and which is novel in concept and construction is herein presented.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A game including a playing surface, a pair of game pieces, each said piece having a plurality of differently delineated segments extending along the length thereof and wherein each such segment is delineated from the others of each said piece in a predetermined linear arrangement, said pieces adapted for lateral side by side disposition to each other while facing in opposite directions on said playing surface, said playing surface having a goal at at least one end thereof, and means for selecting a particular delineation such that the similarly delineated segments of said pair of pieces are laterally positioned adjacent each other by the longitudinal movement of one of said pieces relative to the other and said playing surface whereby one of said pieces may progress towards or away from said goal.

2. The game of claim 1, wherein play is continued by alternating moves of each piece by repeated selection of a particular delineation.

3. The game of claim 1, wherein each piece segment is delineated by a different color and said selection means selects one of the resultant plurality of colors such that each move of the game constitutes the positioning of the same colored segments of the pieces laterally adjacent each other.

4. The game of claim 1 or 3, wherein said selection means includes a spinner supported for rotation above a surface having portions thereof marked with each of said delineations.

5. The game of claim 1, each piece having a front segment and a rear segment.

6. The game of claim 5, each piece constructed to resemble a caterpillar.

7. The game of claim 5, said playing surface being a longitudinally orientated board including a goal line at each end thereof wherein said pieces progress back and forth toward and away from a designated different goal line.

8. The game of claim 7, wherein said pieces are centered on said playing surface to initiate play and said playing surface is of a substantially greater length than that of said pieces.

9. The game of claim 1, wherein said predetermined linear arrangements is the same for each piece.

* * * * *